(12) United States Patent
Chan et al.

(10) Patent No.: US 9,989,077 B2
(45) Date of Patent: Jun. 5, 2018

(54) SYSTEMS AND METHODS FOR SELECTIVE CONTROL OF FUEL TANKS

(71) Applicant: Elwha LLC, Bellevue, WA (US)

(72) Inventors: Alistair K. Chan, Bainbridge Island, WA (US); Jesse R. Cheatham, III, Seattle, WA (US); Hon Wah Chin, Palo Alto, CA (US); Roderick A. Hyde, Redmond, WA (US); Muriel Y. Ishikawa, Livermore, CA (US); Jordin T. Kare, San Jose, CA (US); Max N. Mankin, Cambridge, MA (US); Nathan P. Myhrvold, Medina, WA (US); Tony S. Pan, Bellevue, WA (US); Robert C. Petroski, Seattle, WA (US); Clarence T. Tegreene, Mercer Island, WA (US); Nicholas W. Touran, Seattle, WA (US); David B. Tuckerman, Lafayette, CA (US); Yaroslav A. Urzhumov, Bellevue, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 364 days.

(21) Appl. No.: 14/712,635

(22) Filed: May 14, 2015

(65) Prior Publication Data
US 2016/0332742 A1     Nov. 17, 2016

(51) Int. Cl.
| | |
|---|---|
| *F15D 1/00* | (2006.01) |
| *B60K 15/077* | (2006.01) |
| *B64D 37/00* | (2006.01) |
| *B60K 15/03* | (2006.01) |

(52) U.S. Cl.
CPC .......... *F15D 1/008* (2013.01); *B60K 15/077* (2013.01); *B64D 37/00* (2013.01); *B60K 2015/03375* (2013.01); *B60Y 2306/01* (2013.01)

(58) Field of Classification Search
CPC .............................. F15D 1/008; B60K 15/077
See application file for complete search history.

(56) References Cited

U.S. PATENT DOCUMENTS

| | | | | |
|---|---|---|---|---|
| 3,567,536 A * | 3/1971 | Wickersham, Jr. | ...... | B32B 27/00 156/242 |
| 3,625,872 A * | 12/1971 | Ashida | ................. | C08G 18/092 521/120 |
| 3,691,620 A * | 9/1972 | Harr | ..................... | B60K 15/077 220/88.1 |
| 3,782,588 A * | 1/1974 | Allen | .................. | B60K 15/077 156/242 |
| 3,896,964 A * | 7/1975 | Takei | ................... | B60K 15/077 220/88.1 |
| 4,161,160 A * | 7/1979 | Hicks | .................... | F02M 25/00 123/1 A |

(Continued)

FOREIGN PATENT DOCUMENTS

GB        1129894 A * 10/1968 ........... B60K 15/077

*Primary Examiner* — Liam J Heincer
(74) *Attorney, Agent, or Firm* — Foley & Lardner LLP

(57) ABSTRACT

A fuel tank includes a port and an open-cell foam. The open-cell foam is configured to retain a liquid fuel by an interfacial surface tension between the open-cell foam and the liquid fuel. The open-cell foam is configured to selectively release the liquid fuel when a surfactant is applied to the open-cell foam to reduce the interfacial surface tension between the open-cell foam and the liquid fuel.

33 Claims, 4 Drawing Sheets

(56) References Cited

U.S. PATENT DOCUMENTS

| | | | |
|---|---|---|---|
| 4,764,408 A * | 8/1988 | Stedman | B29C 44/185 |
| | | | 156/264 |
| 5,042,978 A | 8/1991 | Quenin et al. | |
| 5,136,968 A * | 8/1992 | Sarada | B41K 1/54 |
| | | | 101/333 |
| 5,232,119 A * | 8/1993 | Kauffman | B65D 90/029 |
| | | | 220/567.1 |
| 5,319,841 A * | 6/1994 | Yata | B41J 2/17513 |
| | | | 29/450 |
| 5,372,766 A | 12/1994 | Roe | |
| 5,387,207 A | 2/1995 | Dyer et al. | |
| 5,398,839 A * | 3/1995 | Kleyn | B60K 15/03177 |
| | | | 220/4.14 |
| 5,456,235 A * | 10/1995 | Porter | B60K 15/077 |
| | | | 123/509 |
| 5,467,117 A * | 11/1995 | Evans | B41J 2/17553 |
| | | | 347/85 |
| 5,671,001 A * | 9/1997 | Elliot | B41J 2/17513 |
| | | | 347/87 |
| 5,797,376 A * | 8/1998 | Frank | B60K 15/077 |
| | | | 123/509 |
| 6,071,580 A | 6/2000 | Bland et al. | |
| 6,408,979 B1 * | 6/2002 | Forbes | G10K 11/16 |
| | | | 181/198 |
| 6,454,387 B1 * | 9/2002 | Haldorsen | B41J 2/17513 |
| | | | 347/108 |
| 7,270,088 B2 * | 9/2007 | Whitehall | F02M 25/00 |
| | | | 123/1 A |
| 2003/0018093 A1 * | 1/2003 | Free | B41J 2/17513 |
| | | | 521/50 |
| 2005/0181152 A1 * | 8/2005 | Free | B60K 15/00 |
| | | | 428/34.1 |
| 2007/0017918 A1 * | 1/2007 | Kirk | A01D 34/82 |
| | | | 220/563 |
| 2009/0133762 A1 * | 5/2009 | Watanabe | B60K 15/077 |
| | | | 137/565.01 |
| 2009/0263601 A1 * | 10/2009 | Renn | B65D 25/14 |
| | | | 428/35.6 |
| 2011/0278305 A1 * | 11/2011 | Chun | B65D 90/52 |
| | | | 220/563 |
| 2014/0246440 A1 * | 9/2014 | Kopiec | B60K 15/03 |
| | | | 220/563 |
| 2014/0363550 A1 * | 12/2014 | Hamer | B65D 51/2807 |
| | | | 426/321 |

* cited by examiner

SYSTEMS AND METHODS FOR SELECTIVE CONTROL OF FUEL TANKS

BACKGROUND

Vehicular fuel tanks, such as fuel tanks for planes, boats, wheeled vehicles, or tracked vehicles, can include an open-cell foam disposed within the tank or surrounding the outside of the tank to act as a containment measure. Generally speaking, the open-cell foam is configured to trap fuel contained within the tank and prevent the fuel from leaking from the tank in the event of a catastrophic event, such as a plane or a car crash. Typically, the foam provides a sufficient amount of resistance to prevent/impede a flow of fuel from the foam such that the fuel will not escape quickly from the tank.

SUMMARY

One embodiment relates to a fuel tank. The fuel tank includes a port and an open-cell foam. The open-cell foam is configured to retain a liquid fuel by an interfacial surface tension between the open-cell foam and the liquid fuel. The open-cell foam is configured to selectively release the liquid fuel when a surfactant is applied to reduce the interfacial surface tension between the open-cell foam and the liquid fuel.

Another embodiment relates to a fuel tank. The fuel tank includes a port and an open-cell foam. The open-cell foam is configured to retain a liquid fuel by an interfacial surface tension between the open-cell foam and the liquid fuel. The liquid fuel is selectively releasable from the open-cell foam by application of a pressure gradient to the open-cell foam.

Yet another embodiment relates to an airplane fuel tank system. The airplane fuel tank system includes a fuel tank and a surfactant supply system. The fuel tank includes a port and an open-cell foam configured to retain a liquid fuel by an interfacial surface tension between the open-cell foam and the liquid fuel. The surfactant supply system is in fluidic communication with the fuel tank. The surfactant supply system is configured to apply surfactant near the port to reduce the interfacial surface tension between the open-cell foam and the liquid fuel such that an amount of liquid fuel is selectively released from the foam.

Yet another embodiment relates to an airplane fuel tank system. The airplane fuel tank system includes a fuel tank and an air system. The fuel tank includes a port and an open-cell foam configured to retain a liquid fuel by an interfacial surface tension between the open-cell foam and the liquid fuel. The air system is in fluidic communication with the fuel tank. The air system is configured to generate a pressure gradient at the open-cell foam to overcome the interfacial surface tension between the open-cell foam and the liquid fuel such that an amount of liquid fuel is selectively released from the open-cell foam.

Yet another embodiment relates to a method of controlling a flow of liquid fuel from a fuel tank. The method includes containing a liquid fuel within an open-cell foam of a fuel tank by an interfacial surface tension between the open-cell foam and the liquid fuel; applying a surfactant near a port of the fuel tank to reduce the interfacial surface tension between the open-cell foam and the liquid fuel; and releasing the liquid fuel from the open-cell foam through the port of the fuel tank.

Yet another embodiment relates to a method of controlling a flow of liquid fuel from a fuel tank. The method includes containing a liquid fuel within an open-cell foam of a fuel tank by an interfacial surface tension between the open-cell foam and the liquid fuel; applying a pressure gradient to the open-cell foam to overcome the interfacial surface tension between the open-cell foam and the liquid fuel; and releasing the liquid fuel from the open-cell foam through the port of the fuel tank.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
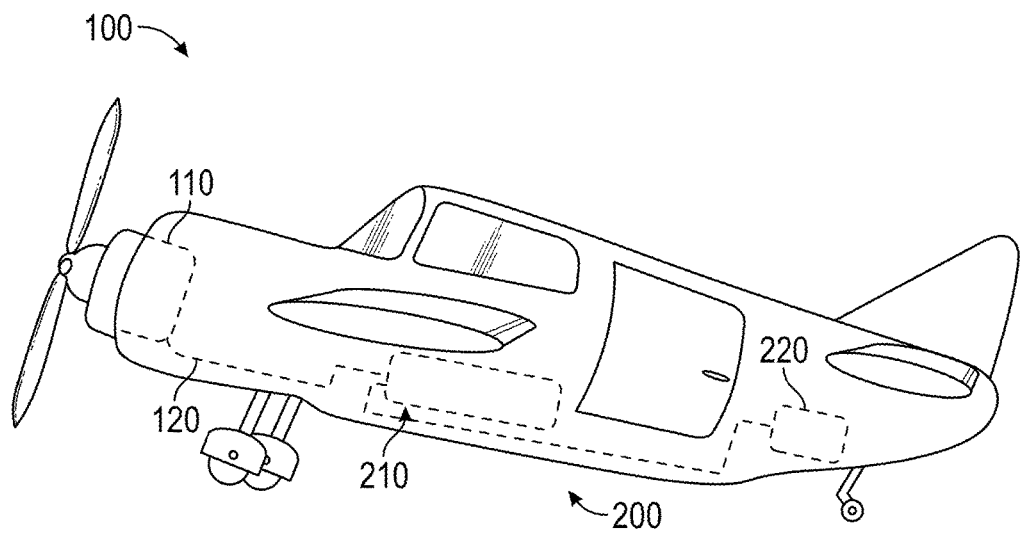
FIG. 1 is a perspective view of an airplane including a fuel tank system, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the Figures, disclosed herein are vehicular fuel tank systems and methods for controlling the same including an open-cell foam configured to hold a volume of liquid fuel. The systems are configured such that the liquid fuel can be selectively released from the foam to allow the fuel, for example, to be used in the vehicle (i.e., the engine) when desired, but can be retained within the open-cell foam by an interfacial surface tension between the open-cell foam and the liquid fuel in the event of an accident or other catastrophic event resulting in damage to the fuel tank. Alternatively, the liquid fuel can be selectively released from the foam to store the liquid fuel in a fuel cell or another reservoir for transport and/or later use. In one embodiment, liquid fuel is selectively and controllably released from the open-cell foam near the fuel line port of the fuel tank by selectively applying a surfactant to the liquid fuel contained within the open-cell foam at an area located near the port, to thereby reduce the interfacial surface tension between the open-cell foam and the liquid fuel. In another embodiment, liquid fuel is selectively and controllably released from the open-cell foam by creating a pressure gradient at an area of the open-cell foam, such as near the fuel line port, to thereby overcome the interfacial surface tension between the open-cell foam and the liquid fuel at that location. In this way, liquid fuel retained within the open-cell foam can be selectively released and distributed as needed, for example, to the engine or to a separate fuel cell or reservoir for transport and/or later use.

As used herein, the term "interfacial" can mean of, relating to, or of the nature of, an interface between a liquid fuel (e.g., gasoline, jet fuel, liquid natural gas, etc.) and an open-cell foam. The term "interfacial" is used throughout this disclosure to describe the surface tension interface between the liquid fuel and the open-cell foam, such that the liquid fuel can be retained within the open-cell foam.

Referring to FIG. 1, a vehicle is shown as airplane 100 including fuel tank system 200, according to one embodiment. As shown in FIG. 1, airplane 100 is a single-engine, propeller driven airplane. According to other embodiments, airplane 100 is another type of aircraft such as a commercial airplane, a fighter jet, a helicopter, or other similar aircraft. Although FIG. 1 depicts an airplane including fuel tank system 200, it is appreciated that fuel tank system 200 can be adapted for use in a variety of different vehicles, such as wheeled vehicles (e.g., cars, trucks, transport vehicles, etc.) or tracked vehicles (e.g., military tanks, construction equipment, etc.).

In the embodiment shown in FIG. 1, airplane 100 includes engine 110 disposed near a front portion of airplane 100. Fuel tank system 200, shown in dashed lines in FIG. 1, includes fuel tank 210 disposed near a middle portion of airplane 100. According to other embodiments, fuel tank 210 is located within a different area of airplane 100, such as, for example, within one or both of the airplane wings, the tail, or near the front of airplane 100. Fuel tank 210 is in fluidic communication with engine 110 via fuel line 120 extending between fuel tank 210 and engine 110. Fuel line 120 is configured to direct liquid fuel from fuel tank 210 to engine 110 to thereby power engine 110.

Fuel tank system 200 further includes surfactant supply system 220 located remotely (e.g., spaced apart from or separated from within a vehicle) from fuel tank 210. As shown in FIG. 1, surfactant supply system 220 is located near the tail portion of airplane 100, although surfactant supply system 220 can be located at another location on airplane 100, such as, for example, near a middle or a front portion of airplane 100, according to other embodiments. In one embodiment, surfactant supply system 220 is removably coupled to airplane 100 such that a user can selectively remove and/or replace surfactant supply system 220 as needed, such as during maintenance or repair of airplane 100. In an embodiment, surfactant supply system 220 is configured (e.g., via an inlet port) such that a user can selectively add or resupply surfactant to the surfactant supply system 220. Surfactant supply system 220 is configured to selectively and controllably supply surfactant to fuel tank 210, such as near a fuel line port of fuel tank 210. The surfactant can be supplied to the liquid fuel. The surfactant can be directed to an open-cell foam contained within the fuel tank 210, and can form a coating between the open-cell foam and the liquid fuel. The surfactant can be directed to an open-cell foam contained within fuel tank 210 near the fuel line port to selectively and controllably release liquid fuel contained within the open-cell foam. The surfactant can reduce/change the interfacial surface tension between the open-cell foam and the liquid fuel so as to release the liquid fuel from the foam. The released liquid fuel can be directed via fuel line 120 to engine 110 or to a fuel cell/reservoir that is separate from fuel tank 210.

Figure 2:
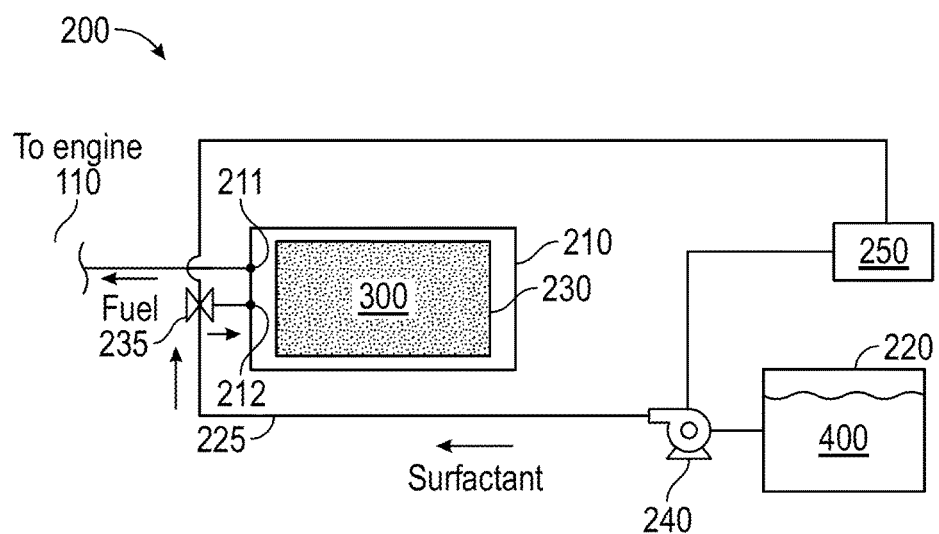
FIGS. 2-3 are schematic illustrations of various fuel tank systems, according to various embodiments.

Referring to FIG. 2, a schematic illustration of fuel tank system 200 is shown, according to one embodiment. In this embodiment, fuel tank 210 includes an open-cell foam 230 disposed within tank 210. In one embodiment, open-cell foam 230 substantially occupies the interior of fuel tank 210. According to another embodiment (shown in FIG. 4B), open-cell foam 230 is a liner disposed along an interior surface of fuel tank 210 and having a thickness defining an open area within fuel tank 210. According to another embodiment (shown in FIG. 4A), open-cell foam 230 only occupies a portion of fuel tank 210, at, within, or near port 211. Open-cell foam 230 is configured to retain a volume of liquid fuel 300 (e.g., gasoline, jet fuel, liquid natural gas (LNG), etc.) within the foam via an interfacial surface tension between the foam and the liquid fuel, as represented in FIG. 2.

For example, according to one embodiment, open-cell foam 230 is made from a foam having a plurality of openings (i.e., cells) disposed throughout the foam. In one embodiment, open-cell foam 230 has a homogeneous structure. In another embodiment, open-cell foam 230 includes one or more channels (i.e., flow channels) for directing a flow of liquid fuel 300 within an interior portion of open-cell foam 230. The channels can help direct the movement of liquid fuel 300 within open-cell foam 230 such as, for example, when a volume of surfactant is received within open-cell foam 230. In various embodiments, open-cell foam 230 can be made from a variety of different foam materials or combinations of foam materials, such as polyurethane foam or any other foam suitable to retain liquid fuel 300 by interfacial surface tension. In another embodiment, open-cell foam 230 includes a coating having a sufficient interface energy with liquid fuel 300 such that liquid fuel 300 is retained within open-cell foam 230 by an interfacial surface tension between the coating and liquid fuel 300.

In the embodiment of FIG. 2, liquid fuel 300 is an airplane fuel retained within open-cell foam 230 by an interfacial surface tension between open-cell foam 230 and liquid fuel 300. In this embodiment, the entire volume of liquid fuel 300 is retained within open-cell foam 230 by virtue of an interfacial surface tension between open-cell foam 230 and liquid fuel 300. Fuel tank 210 also includes fuel line port 211 fluidly coupling fuel line 120 to fuel tank 210. Fuel line port 211 is configured to direct liquid fuel 300 contained within fuel tank 210 (i.e., open-cell foam 230) to fuel line 120. Fuel tank 210 also includes second port 212 configured to receive a supply of surfactant from surfactant supply system 220. As shown in FIG. 2, fuel tank system 200 further includes valve 235 disposed between fuel tank 210 and surfactant supply system 220. Valve 235 is fluidly coupled to surfactant supply system 220 via conduit 225.

According to one embodiment, surfactant supply system 220 is or includes a tank configured to hold a volume of surfactant 400. In one embodiment, the tank is reinforced (e.g., bombproofed, etc.) so as to protect surfactant 400 contained therein. According to various embodiments, surfactant 400 can be a powder, a liquid, or a gas. Surfactant 400 can be, for example, 4-(5-Dodecyl) benzenesulfonate, a linear dodecylbenzenesulfonate, which is one of the most common surfactants in commercial use today. According to other embodiments, surfactant 400 can be a soap, a linear alkylbenzenesulfonate, a lignin sulfonate, a fatty alcohol ethoxylate, an alkylphenol ethoxylate, or another type of surfactant suitable for reducing the interfacial surface tension between open-cell foam 230 and liquid fuel 300. As explained above, surfactant 400 can reduce the interfacial surface tension between open-cell foam 230 and liquid fuel 300 so as to selectively and controllably release liquid fuel 300 contained within open-cell foam 230.

As shown in FIG. 2, pump 240 is disposed along conduit 225 between surfactant supply system 220 and valve 235. Pump 240 is configured to provide a flow of surfactant 400 to valve 235 (denoted by arrows in FIG. 2). Valve 235 is configured to selectively distribute surfactant 400 through second port 212 to liquid fuel 300 contained within open-cell foam 230. That is, surfactant 400 is directed to the portion of open-cell foam 230 located near fuel line port 211. Surfactant 400 can reduce the interfacial surface tension of liquid fuel 300 located near fuel line port 211 so as to release liquid fuel 300 from open-cell foam 230. The released liquid fuel 300, along with applied surfactant 400, is directed away from open-cell foam 230 toward fuel line port 211 and outward to, for example, engine 110 via fuel line 120. Surfactant 400 can be continuously applied to open-cell foam 230 so long as a release of liquid fuel 300 is desired/requested (e.g., by engine 110). In this way, surfactant supply system 220 provides surfactant 400 to a localized area of open-cell foam 230 (e.g., an area near fuel line port 211) to selectively and controllably release liquid fuel 300 from open-cell foam 230.

According to one embodiment, surfactant supply system 220 further includes a supply of inverse surfactant. Inverse surfactant can be applied to an area of open-cell foam 230 where surfactant 400 was previously applied, such as, for example, near fuel line port 211. Inverse surfactant can undo the effects of surfactant 400 so as to prevent/impede a flow of liquid fuel 300 from open-cell foam 230. In one embodiment, inverse surfactant directly increases the interfacial surface tension between open-cell foam 230 and liquid fuel 300. In another embodiment, inverse surfactant modifies (e.g., changes, destroys, eliminates, etc.) surfactant 400 that was previously applied to open-cell foam 230, such as by a chemical reaction. In this way, surfactant supply system 220 can provide inverse surfactant to a localized area of open-cell foam 230 (e.g., an area near fuel line port 211) to selectively impede/prevent a flow of liquid fuel 300 from open-cell foam 230.

Still referring to FIG. 2, valve 235 and pump 240 are each operatively coupled to control system 250. Control system 250 is configured to allow a user to selectively control a flow of surfactant 400 from surfactant supply system 220. By allowing selective control of surfactant 400, the user can control the amount of liquid fuel 300 released from open-cell foam 230 (i.e., fuel tank 210). Control system 250 is discussed in greater detail below with reference to FIGS. 5-7.

Figure 3:
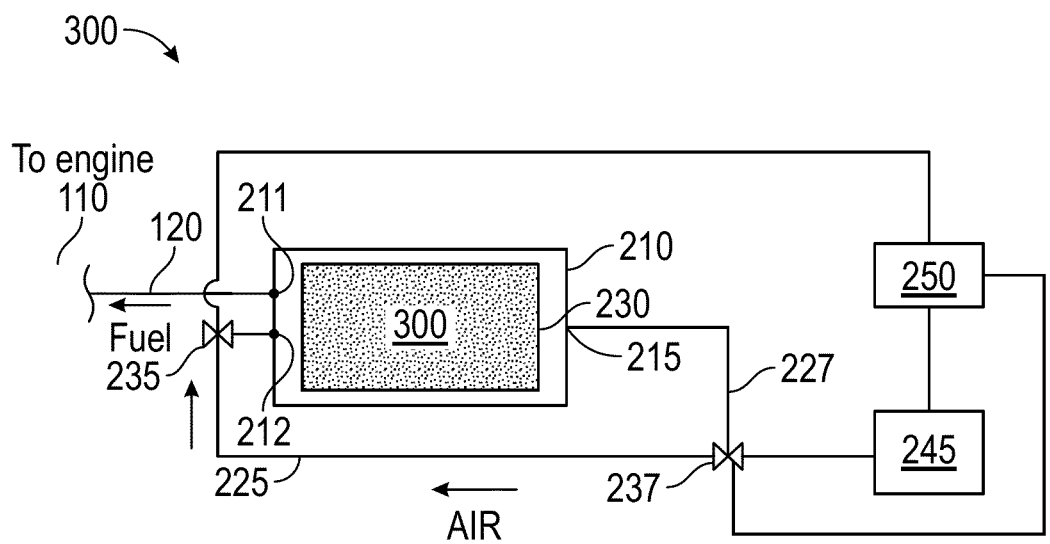

Referring now to FIG. 3, a schematic illustration of fuel tank system 300 is shown, according to one embodiment. In this embodiment, surfactant supply system 220 is replaced with air system 245. Air system 245 is in fluidic communication with second port 212 via conduit 225 and valve 235. Air system 245 is also in fluidic communication with third port 215 located opposite from second port 212 via conduit 227. Both conduits 225 and 227 are fluidly connected to air system 245. Valve 237 is disposed between air system 245 and conduits 225 and 227. Similar to surfactant supply system 220, air system 245 is operatively coupled to control system 250 to allow for the selective control of air system 245. In various embodiments, air system 245 is configured to generate a pressure gradient at open-cell foam 230 to overcome the interfacial surface tension between open-cell foam 230 and liquid fuel 300 contained therein to selectively control the release of liquid fuel 300 from open-cell foam 230. For example, in one embodiment, air system 245 is configured to create a vacuum (i.e., a negative pressure), for instance by use of a suction pump or a vacuum pump, at an area of open-cell foam 230 near fuel line port 211 via conduit 225 and valve 235. The vacuum is sufficient to create a pressure gradient that overcomes the interfacial surface tension between open cell foam 230 and liquid fuel 300, to thereby release liquid fuel 300 from open-cell foam 230 near fuel line port 211. In another embodiment, air system 245 is configured to over-pressurize (i.e., apply a positive pressure to, for instance, by use of a pump) an area of open-cell foam 230, such as the area near third port 215 located opposite fuel line port 211, to thereby force liquid fuel 300 that is present in open-cell foam 230 to release from open-cell foam 230 at an area opposite from the area of applied pressure, such as near fuel line port 211. That is, the applied pressure is sufficient to overcome the interfacial surface tension between open cell foam 230 and liquid fuel 300 so as to selectively release liquid fuel 300 from open-cell foam 230 near fuel line port 211. In other embodiments, fuel tank system 300 can use a different pressurant other than air. For example, fuel tank system 300 can use another type of gas or a liquid. In some embodiments, liquid fuel itself can be used as a liquid pressurant and a pump can be used to raise the pressure of the liquid fuel.

Figure 4A:
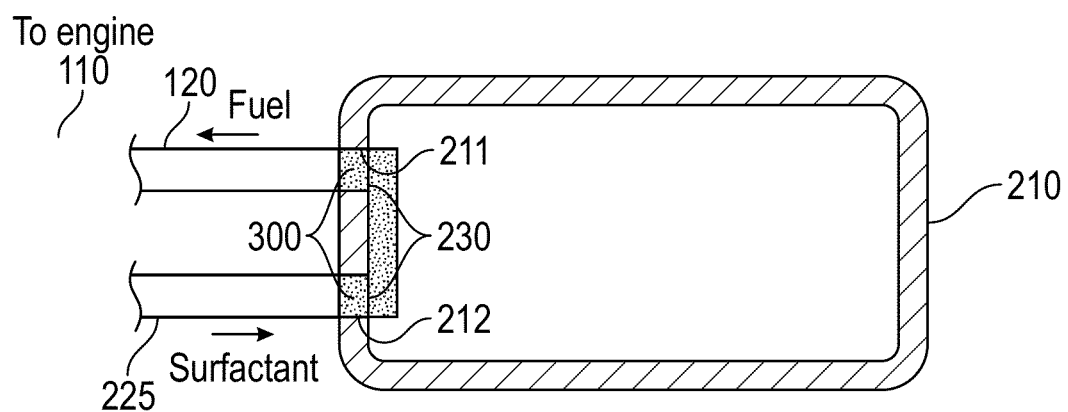
FIG. 4A is a cross-sectional view of a fuel tank, according to one embodiment.

Referring to FIG. 4A, a cross-sectional view of fuel tank 210 is shown, according to one embodiment. In this embodiment, fuel tank 210 includes open-cell foam 230 arranged within a flow conduit of fuel line port 211. In one embodiment, open-cell foam 230 may optionally extend within an interior portion of tank 210 to the vicinity of second port 212. As shown in FIG. 4A, liquid fuel 300 is shown contained within open-cell foam 230. However, according to another embodiment, at least a portion of liquid fuel 300 is present within an interior portion of tank 210. In the embodiment shown, when surfactant is received locally at open-cell foam 230 at fuel line port 211 or at second port 212 near fuel line port 211, liquid fuel 300 can be released from open-cell foam 230 and directed outward through fuel line port 211 away from open-cell foam 230 along with the applied surfactant toward, for example, engine 110. The amount of surfactant 400 is small compared to the amount of liquid fuel 300 released from open-cell foam 230, thereby preventing any damage to engine 110.

Figure 4B:
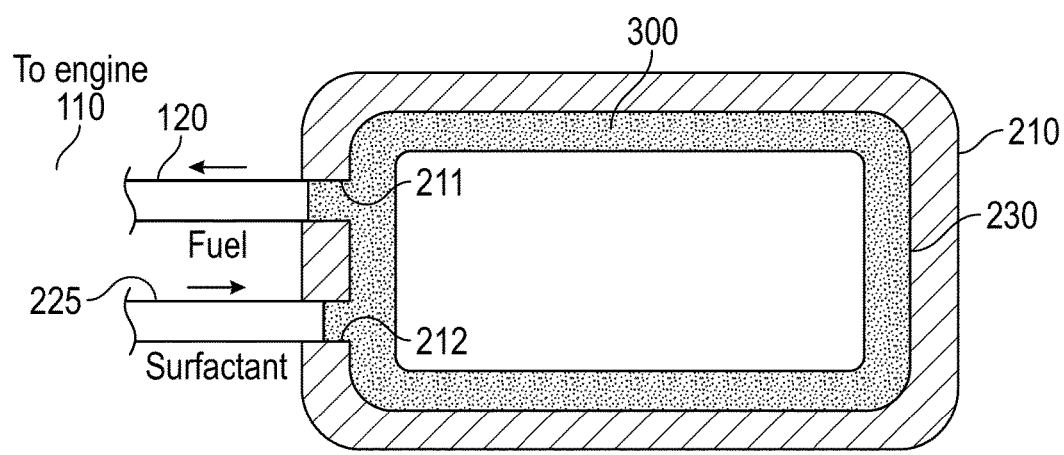
FIG. 4B is a cross-sectional view of a fuel tank, according to another embodiment.

Referring to FIG. 4B, a cross-sectional view of fuel tank 210 is shown, according to another embodiment. In this embodiment, fuel tank 210 includes open-cell foam 230 disposed along an interior surface of fuel tank 210. Open cell foam 230 substantially surrounds the interior surface of fuel tank 210 defining an open area/void within a middle portion of fuel tank 210. As shown in FIG. 4B, liquid fuel 300 is shown contained within open-cell foam 230. However, according to another embodiment, at least a portion of liquid fuel 300 is present within the open area/void of tank 210. In the embodiment shown, when surfactant is received locally at second port 212 near fuel line port 211, liquid fuel 300 can be released from open-cell foam 230 and directed outward through fuel line port 211 away from open-cell foam 230 along with the surfactant.

Figure 5:
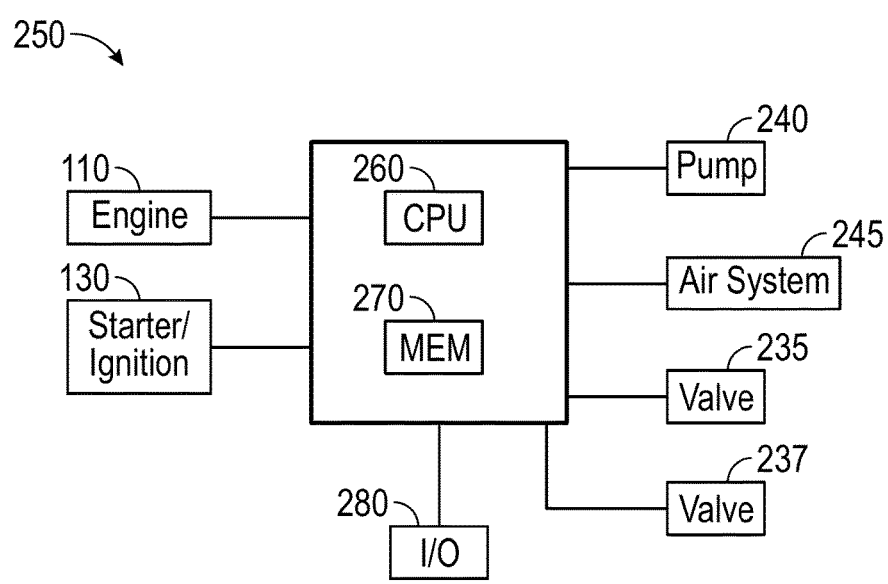
FIG. 5 is a schematic illustration of a control system, according to one embodiment.

Referring to FIG. 5, control system 250 is shown, according to one embodiment. As explained above, in various embodiments, control system 250 allows for the selective control of liquid fuel flow from fuel tank system 200. Control system 250 includes central processing unit 260 (CPU) and memory 270 for storing various information. Central processing unit 250 is configured to receive a request in the form of an electronic signal from engine 110 to receive liquid fuel 300 so as to power engine 110. Similarly, central processing unit 110 is configured to receive a request in the form of an electronic signal from starter/ignition 130 of airplane 100 to send liquid fuel 300 to engine 110. In one embodiment, central processing unit 260 is configured to process the received signal and to selectively control pump 240 by sending a control signal to pump 240 to provide surfactant 400 to fuel tank 210. Central processing unit 260 can also send a control signal to valve 235 to selectively distribute surfactant 400 to tank 210 at fuel line port 211. In another embodiment, central processing unit 260 is configured to process the received signal (i.e., a request for liquid fuel from engine 110 and/or starter/ignition 130) and to selectively control air system 245 by sending a control signal to air system 245 and valves 235 or 237, to generate a pressure gradient in the form of a negative pressure at second port 212 or in the form of a positive pressure at third port 215. In both embodiments, the interfacial surface tension between liquid fuel 300 and open-cell foam 230 is overcome such that liquid fuel 300 is controllably released from open-cell foam 230. Control system 250 also includes I/O port 280 for sending and receiving various electronic control signals to and from control system 250 (e.g., electronic signals, audio signals, visual signals, alerts, etc.). In an embodiment, control system 250 can receive an alert via I/O port 280 of an emergency (e.g., an occurring impact, an impending impact, a fire, etc.) and can selectively prevent delivery of surfactant (e.g., by closing valve 235 or 237, or by preventing operation of pump 240, etc.).

In the various embodiments described herein, central processing unit 260 may be implemented as a general-purpose processor, an application specific integrated circuit (ASIC), one or more field programmable gate arrays (FPGAs), a digital-signal-processor (DSP), a group of processing components, or other suitable electronic processing components. Memory 270 is one or more devices (e.g., RAM, ROM, Flash Memory, hard disk storage, etc.) for storing data and/or computer code for facilitating the various processes described herein. Memory 270 may be or include non-transient volatile memory or non-volatile memory. Memory 270 may include database components, object code components, script components, or any other type of information structure for supporting the various activities and information structures described herein. Memory 270 may be communicably connected to central processing unit 260 and provide computer code or instructions to central processing unit 260 for executing the processes described herein.

Figure 6:
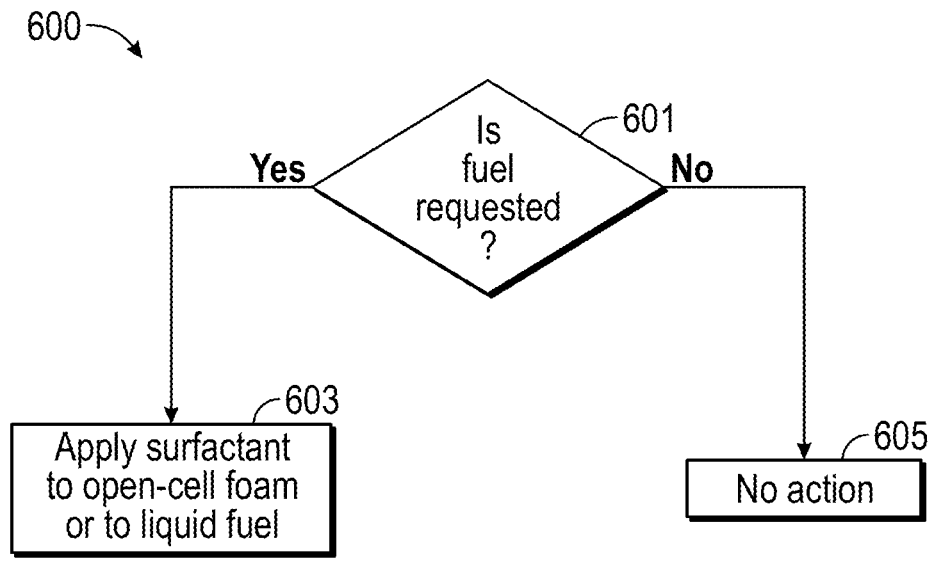
FIGS. 6-7 illustrate various flow diagrams for controlling a fuel tank system, according to various embodiments.
Figure 7:
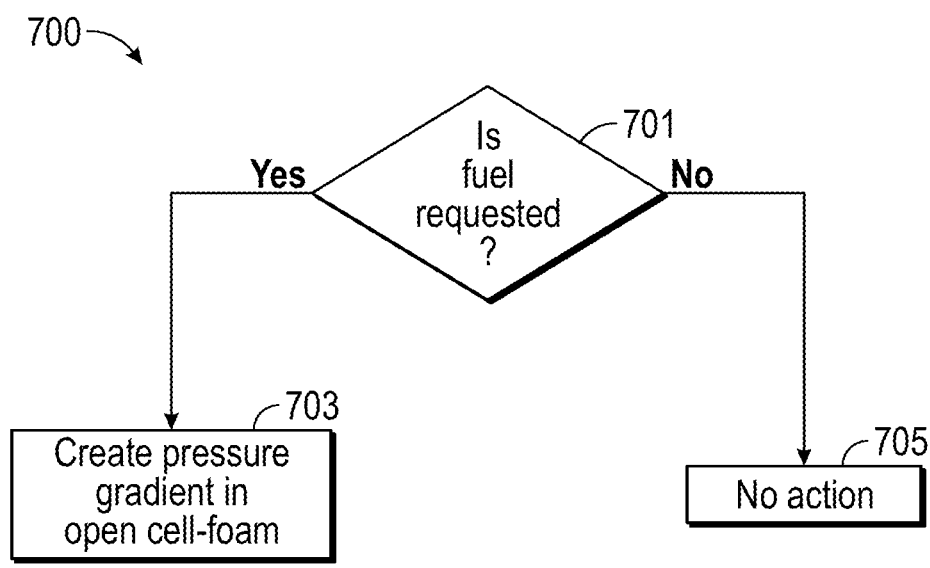

Referring to FIGS. 6-7, various methods for controlling a flow of liquid fuel from fuel tank 210 are shown, according to various embodiments. In one embodiment shown in FIG. 6, method 600 includes receiving a request in the form of an electronic signal from engine 110 and/or starter/ignition 130 to receive a volume of liquid fuel 300 to power engine 110 (601). According to another embodiment, the request for liquid fuel is received from a different source, such as a user, to transfer liquid fuel from fuel tank 210 to a remote fuel cell or reservoir. In the embodiment shown, fuel tank system 200 includes surfactant supply system 220. As shown in FIG. 6, if liquid fuel 300 is requested, surfactant 400 is applied to open-cell foam 230 at second port 212 near fuel line port 211 to selectively and controllably reduce the interfacial surface tension between open-cell foam 230 and liquid fuel 300 contained therein (603). Liquid fuel 300 can then be selectively released from the area of open-cell foam 230 near fuel line port 211 to, for example, engine 110. Central processing unit 260 can send a control signal to surfactant supply system 220 to continuously supply surfactant 400 to fuel tank 210 so long as liquid fuel 300 is needed/requested. If no request for liquid fuel 300 is received, no action is performed and liquid fuel 300 will remain contained within open-cell foam 230 (605).

In another embodiment shown in FIG. 7, method 700 includes receiving a request in the form of an electronic signal from engine 110 and/or starter/ignition 130 to receive a volume of liquid fuel 300 to power engine 110 (601). According to another embodiment, the request for liquid fuel is received from a different source, such as a user, to transfer liquid fuel from fuel tank 210 to a remote fuel cell or reservoir. In this embodiment, fuel tank system 200 includes air system 245. As shown in FIG. 7, if liquid fuel 300 is requested, method 600 includes applying a pressure gradient (e.g., a positive or negative pressure) to open-cell foam 230 at either second port 212 near fuel line port 211 or at third port 215 located opposite from fuel line port 211, to selectively and controllably overcome the interfacial surface tension between open-cell foam 230 and liquid fuel 300 contained therein (703). Liquid fuel 300 can then be selectively released from the area of open-cell foam 230 near fuel line port 211 to, for example, engine 110. Central processing unit 260 can send a control signal to air system 245 to continuously apply a pressure gradient to fuel tank 210 (i.e., open-cell foam 230) so long as liquid fuel 300 is needed/requested. If no request for liquid fuel 300 is received, no action is performed and liquid fuel 300 will remain contained within open-cell foam 230 (705).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A fuel tank, comprising:
a port;
an open-cell foam configured to retain a liquid fuel by an interfacial surface tension between the open-cell foam and the liquid fuel; and
a surfactant supply source including a surfactant;
wherein the surfactant supply source is configured to apply the surfactant to at least one of the open-cell foam and the liquid fuel to reduce the interfacial surface tension between the open-cell foam and the liquid fuel so as to selectively release the liquid fuel from the fuel tank.

2. The tank of claim 1, wherein the port is configured to provide a flow channel out of the tank for the released liquid fuel.

3. The tank of claim 1, wherein the open-cell foam is disposed within the fuel tank.

4. The tank of claim 1, wherein the open-cell foam is disposed within a flow conduit of the port.

5. The tank of claim 1, wherein the open-cell foam is homogeneous.

6. The tank of claim 1, wherein the tank defines an interior space, and wherein the open-cell foam substantially occupies the interior space.

7. The tank of claim 1, wherein the open-cell foam is a liner disposed on an interior wall of the tank defining an open area within the tank.

8. The tank of claim 1, wherein an interior portion of the open-cell foam includes a flow channel configured to direct liquid fuel from the interior portion to a portion of the open-cell foam located near the port.

9. The tank of claim 1, wherein the open-cell foam is configured to release the liquid fuel near the port.

10. The tank of claim 1, wherein the open-cell foam is configured such that the surfactant exits the tank through the port along with the amount of liquid fuel released from the foam.

11. The tank of claim 1, further comprising a controller configured to selectively control a flow of the surfactant from the surfactant supply source to the port.

12. The tank of claim 11, wherein the controller is configured to prevent the flow of the surfactant to the port in response to receiving an alert signal.

13. The tank of claim 1, further comprising an inverse surfactant supply configured to provide an inverse surfactant to prevent liquid fuel from being released from the open-cell foam at an area where the surfactant was previously applied.

14. The tank of claim 1, wherein the surfactant includes a powder.

15. The tank of claim 1, further comprising a surfactant supply tank configured to hold the surfactant.

16. The tank of claim 15, wherein the surfactant supply tank is located remotely from the fuel tank.

17. An airplane fuel tank system, comprising:
a fuel tank, the fuel tank comprising:
a port, and
an open-cell foam configured to retain a liquid fuel by an interfacial surface tension between the open-cell foam and the liquid fuel; and
a surfactant supply system including a surfactant; in fluidic communication with the fuel tank;
wherein the surfactant supply system is configured to provide the surfactant to the fuel tank to reduce the interfacial surface tension between the open-cell foam and the liquid fuel such that an amount of liquid fuel is selectively released from the open-cell foam.

18. The system of claim 17, wherein the port is configured to provide a flow channel out of the fuel tank for the released liquid fuel.

19. A method of controlling a flow of liquid fuel from a fuel tank, comprising:
containing a liquid fuel within an open-cell foam of a fuel tank by an interfacial surface tension between the open-cell foam and the liquid fuel;
applying a surfactant near a port of the fuel tank to reduce the interfacial surface tension between the open-cell foam and the liquid fuel; and
releasing the liquid fuel from the open-cell foam through the port of the fuel tank.

20. The method of claim 19, wherein the port is configured to provide a flow channel out of the tank for the released liquid fuel.

21. The method of claim 19, wherein the surfactant is applied to the open-cell foam.

22. The method of claim 19, wherein the surfactant is applied to the liquid fuel.

23. The method of claim 19, wherein the open-cell foam is disposed within the fuel tank.

24. The method of claim 19, wherein the open-cell foam is disposed within a flow conduit of the port.

25. The method of claim 19, wherein the tank defines an interior space, and wherein the open-cell foam substantially occupies the interior space.

26. The method of claim 19, wherein an interior portion of the open-cell foam includes a flow channel, and wherein releasing the liquid fuel from the open-cell foam includes directing the liquid fuel from the interior portion to a portion of the open-cell foam near the port via the flow channel.

27. The method of claim 19, wherein applying the surfactant near the port includes locally applying the surfactant to the open-cell foam near the port.

28. The method of claim 19, wherein the liquid fuel is released from the open-cell foam while applying the surfactant.

29. The method of claim 19, wherein applying the surfactant includes selectively controlling a flow of the surfactant by a computer controller.

30. The method of claim 29, wherein the computer controller is configured to prevent the flow of the surfactant in response to receiving an alert signal.

31. The method of claim 19, further comprising applying an inverse surfactant to the open-cell foam at an area where the surfactant was previously applied to prevent liquid fuel from being released.

32. The method of claim 31, wherein applying the inverse surfactant includes increasing the interfacial surface tension between the open-cell foam and the liquid fuel.

33. The method of claim 19, wherein the surfactant is stored in a surfactant supply tank.

* * * * *